United States Patent
Paluncic et al.

(10) Patent No.: US 7,159,606 B2
(45) Date of Patent: Jan. 9, 2007

(54) RESERVOIR FOR A LUBRICANT PUMP

(75) Inventors: Zdravko Paluncic, Ludwigshafen (DE); Andreas Schönfeld, St. Leon-Rot (DE)

(73) Assignee: Lincoln GmbH & Co. KG, Walldorf (DE)

( * ) Notice: Subject to any disclaimer, the term of this patent is extended or adjusted under 35 U.S.C. 154(b) by 347 days.

(21) Appl. No.: 10/478,254

(22) PCT Filed: May 23, 2003

(86) PCT No.: PCT/EP03/05386

§ 371 (c)(1),
(2), (4) Date: Nov. 19, 2003

(87) PCT Pub. No.: WO03/100314

PCT Pub. Date: Dec. 4, 2003

(65) Prior Publication Data

US 2004/0144424 A1    Jul. 29, 2004

(30) Foreign Application Priority Data

May 29, 2002   (DE) .......................... 202 08 365 U

(51) Int. Cl.
  *F16K 24/04*    (2006.01)
  *F16K 17/26*    (2006.01)
  *B01D 50/00*    (2006.01)
(52) U.S. Cl. .................. 137/199; 137/493.9; 55/385.4
(58) Field of Classification Search ................ 137/197, 137/199, 493.9, 587; 55/385.5, 524; 220/203.13, 220/203.28
See application file for complete search history.

(56) References Cited

U.S. PATENT DOCUMENTS

| | | | | | |
|---|---|---|---|---|---|
| 2,273,737 | A | * | 2/1942 | Snyder | .................... 137/493.9 |
| 3,326,230 | A | * | 6/1967 | Frank | .......................... 137/199 |
| 3,425,193 | A | * | 2/1969 | Emmerson | ................. 55/385.4 |
| 4,512,492 | A | * | 4/1985 | Graybeal | ............... 220/203.28 |
| 4,757,654 | A | * | 7/1988 | Korhonen et al. | ............ 52/199 |
| 4,957,522 | A | * | 9/1990 | Brassell | .................... 55/385.4 |
| 5,125,428 | A | | 6/1992 | Rauter | |
| 5,348,570 | A | | 9/1994 | Ruppert, Jr. et al. | |
| 5,752,746 | A | | 5/1998 | Perry | |
| 6,305,404 | B1 | | 10/2001 | Steiger | |
| 2002/0195141 | A1 | * | 12/2002 | Ruschke | ..................... 137/199 |

FOREIGN PATENT DOCUMENTS

| | | |
|---|---|---|
| DE | 24 06 719 | 8/1975 |
| DE | 44 33 170 | 3/1996 |
| DE | 198 09 620 | 3/1998 |
| EP | 0 831 572 | 3/1998 |

* cited by examiner

*Primary Examiner*—John Rivell
(74) *Attorney, Agent, or Firm*—Wenderoth, Lind & Ponack, L.L.P.

(57) ABSTRACT

The invention relates to a storage reservoir for receiving grease or a like lubricant for a lubricant pump with a, for example, cylindrical side wall and a cover wall closing off a reservoir interior space at a top of the side wall. A pressure compensation device is disposed such that the reservoir interior space is flow-connected with a reservoir exterior space via an air-permeable but water-impermeable membrane.

19 Claims, 2 Drawing Sheets

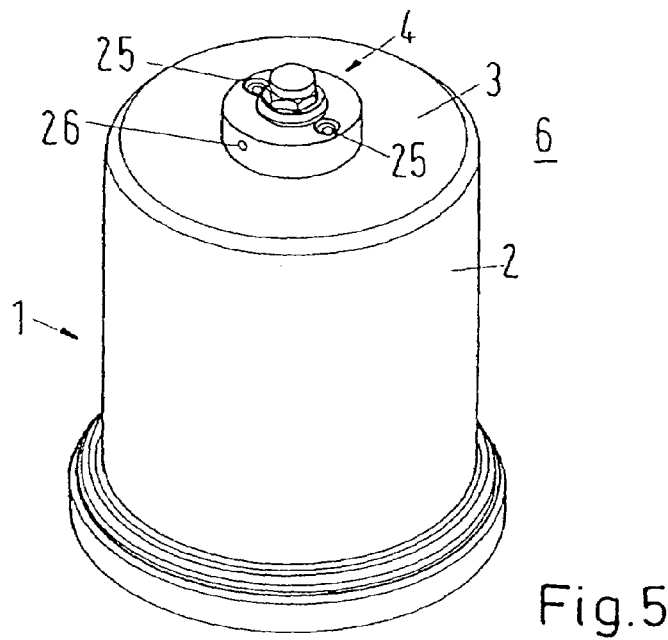
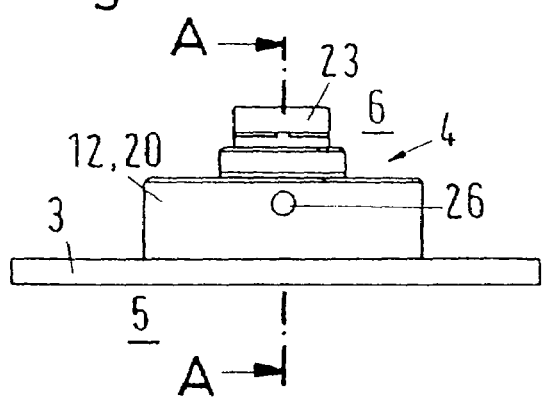
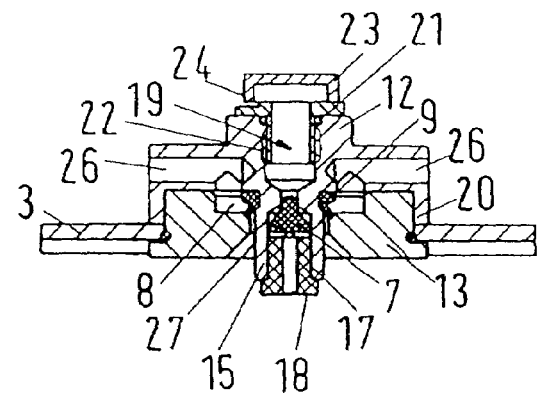
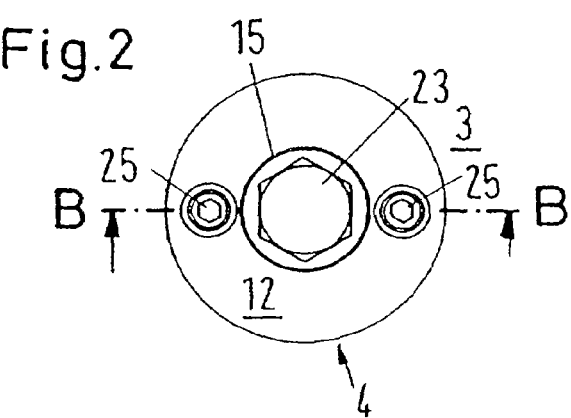

RESERVOIR FOR A LUBRICANT PUMP

The invention relates to a storage reservoir for receiving grease or a like lubricant for a lubricant pump.

A task of the present invention is to implement such a storage reservoir such that a dependable pressure compensation during operation is possible even under water.

This task is solved in such a storage reservoir with, for example a cylindrical side wall and a cover wall closing a reservoir interior space at a top of the side wall, by disposing in the cover wall a pressure compensation device such that the reservoir interior space is flow-connected with a reservoir exterior space via an air permeable but water impermeable membrane.

This ensures that an underpressure generated in the reservoir interior space, if lubricant is drawn from the storage reservoir by the lubricant pump, can at any time be compensated by slip-streaming air. However, due to properties of the membrane, water cannot penetrate into the reservoir interior space.

For simple assembly the membrane can advantageously be integrated into a machine screw which, in the proximity of a through channel of the pressure compensation device, can be screwed in.

The air-permeable but water-impermeable membrane can comprise, for example, a textile material, onto which polytetrafluoroethylene (PTFF available for example under the tradename Teflon) is applied. Such materials are known, for example, under the brand name "Goretex".

Accordingly, in the event the storage reservoir is overfilled with lubricant, not only displaced air but also lubricant can reach the reservoir exterior space via the pressure compensation device. In a further development of this inventive idea, the pressure compensation device comprises an outlet valve which opens in the event of overfilling with lubricant.

This overfill outlet valve for air and lubricant preferably comprises a radial shaft sealing ring, which under pressure from outside forms a seal and whose soft sealing lip under pressure from inside lifts from a seal seat.

For a purpose of simple assembly and reliable functional operation, the pressure compensation device can be tightly clamped in an opening of the cover wall.

The pressure compensation device can for this purpose comprise an upper part and a lower part, which can be clamped in an opening of the cover wall by interspacing a sealing ring in order to avoid leakage.

To obtain a compact structure it is advantageous if the upper part coaxially penetrates through the lower part with a central plug, on which the seal seat for the radial shaft sealing ring is developed, leaving free a minimal annular escape gap for air and lubricant.

In a further development of this inventive idea, a check valve can be disposed in a throughlet channel comprising the membrane of the pressure compensation device, viewed from a direction of the reservoir interior space in front of the membrane, which valve closes under overpressure occurring in the reservoir interior space, which prevents the membrane located further toward the outside from coming into contact with lubricant.

The invention further proposes that for easier assembly the upper part can be centered with a circumferential edge on the lower part.

Additional objectives, characteristics, advantages and application feasibilities of the invention are evident based on the following description of embodiment examples in conjunction with drawings. All described and/or graphically represented characteristics by themselves or in any combination form the subject matter of the invention, independently of their summarization in the claims.

BRIEF DESCRIPTION OF THE DRAWINGS

FIG. 1 shows a storage reservoir comprising the invention in oblique view,

FIG. 2 is a top view onto a pressure compensation device in an upper cover wall of the storage reservoir according to FIG. 1, FIG. 4 is a side view of the pressure compensation device according to FIG. 2, and FIG. 5 shows a vertical section through the pressure compensation device along line A—A in FIG. 4.

DETAILED DESCRIPTION OF THE PREFERRED EMBODIMENTS

Figure 3:
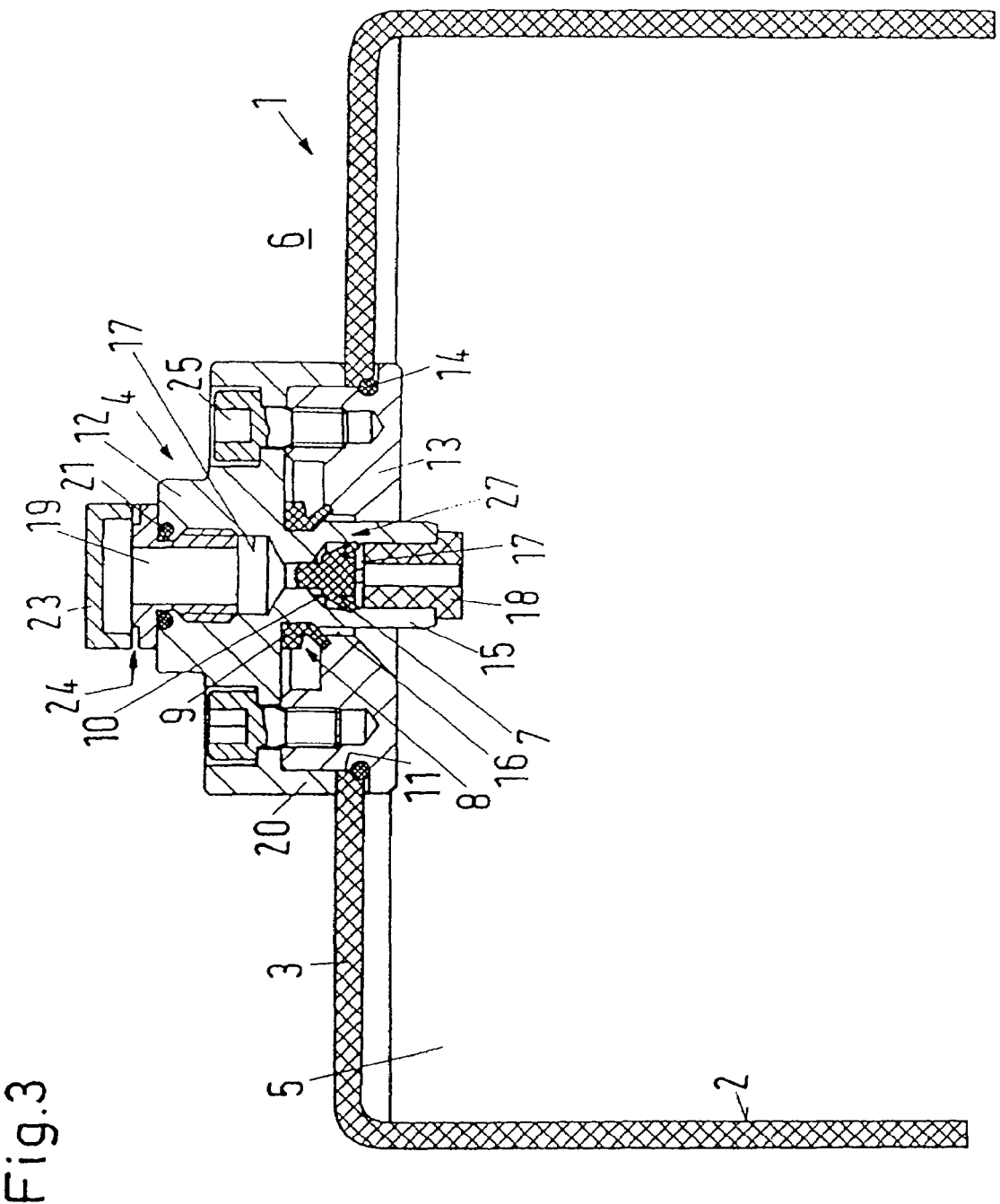
FIG. 3 shows a vertical section through the pressure compensation device along line B—B in FIG. 2.

Depicted storage reservoir 1 serves for receiving grease or a like lubricant for a (not shown) lubricant pump. The storage reservoir 1 has a cylindrical side wall 2 and a cover wall 3 closing off a reservoir internal space 5 at a top of the side wall. A pressure compensation device 4 is disposed in the cover wall 3.

The pressure compensation device 4 comprises in a through channel 17 a membrane, which extends coaxially in an upper part 12 of the pressure compensation device 4 and is integrated in a machine screw head 23, which can be screwed in from above, wherein the membrane is air-permeable but water-impermeable. Machine screw 19 is sealed off at its periphery by a sealing ring 21.

In the through channel 17 beneath the membrane is disposed an overpressure valve 27, whose valve body 7 under overpressure in the reservoir interior space 5, occurring, for example, when filling the storage reservoir 1 with fresh lubricant, is placed upwardly against a sealing seat. This prevents lubricant from reaching the membrane and impairing its function. If, in contrast, lubricant is drawn out from the reservoir interior space 5 by a (not shown) lubricant pump, generation of underpressure in the reservoir interior space 5 is avoided such that air can slip-stream from a reservoir exterior space 6 into the reservoir interior space 5 through a supply slot 24, remaining free beneath the machine screw head 23, and the membrane. In this process the overpressure valve 27 opens. A movement path of valve body 7 is delimited by a sleeve 18 of synthetic material placed from below into the throughchannel 17.

The upper part 12 comprises a circumferential edge 20, with which it is centered on a lower part 13 of the pressure compensation device 4. Upper part 12 and lower part 13 have a somewhat greater diameter than an opening 11 in the cover wall 3. In this way, upper part 12 and lower part 13, by interspacing a sealing ring 14 can be tightly clamped on an edge of the opening 11 by clamping screws 25.

The upper part 12 projects with a central plug 15 through the lower part 13, leaving free an escape gap 16 for air and lubricant in the event of overfilling. Above the escape gap 16 on the central plug 15 is developed a sealing seat 10 for a radial shaft sealing ring 9, such that an outlet valve 8 is formed. As evident in FIG. 3, the radial shaft sealing ring 9 has a sealing lip above the escape gap 16, which, under pressurization from inside, can become raised from the sealing seat 10, such that excess air and lubricant can escape through radial outlet channels 26.

In this way a storage reservoir for a lubricant pump is provided, in which air pressure compensation occurs during filling of the reservoir interior space with lubricant and emptying of lubricant from the reservoir interior space. Yet, utilization under water is possible. When overfilling the reservoir, further escape of lubricant via the pressure compensation device is ensured without an air-permeable but water-impermeable membrane coming into contact with lubricant, whereby the membrane would be impaired in terms of its function. The pressure compensation device forms an easily mountable structural unit.

LIST OF REFERENCE NUMBERS

1 Storage reservoir
2 Side wall
3 Cover wall
4 Pressure compensation device
5 Reservoir interior space
6 Reservoir exterior space
7 Valve body
8 Outlet valve for air and lubricant
9 Radial shaft sealing ring
10 Sealing seat
11 Opening
12 Upper part
13 Lower part
14 Sealing ring
15 Center plug
16 Escape gap for air and lubricant
17 Through channel for air
18 Sleeve
19 Machine screw with integrated membrane
20 Circumferential edge
21 Sealing ring
22 Threads
23 Machine screw head
24 Supply slot for air
25 Clamping screws
26 Outlet channels for air and lubricant
27 Overpressure valve

The invention claimed is:

1. A storage reservoir for receiving lubricant for a lubricant pump, comprising:
a side wall defining a reservoir interior space;
a cover wall, at an end of said side wall, for closing the reservoir interior space; and
a pressure compensation device having an air permeable but water impermeable membrane for communicating the reservoir interior space with a space exterior of the reservoir interior space,
wherein said pressure compensation device includes a lower part and an upper part having a central plug, with said central plug coaxially penetrating through said lower part such that defined between said central plug and said lower part is an annular escape gap for air and lubricant in the event of overfilling, and with said central plug having thereon a sealing seat for a radial shaft sealing ring.

2. The storage reservoir according to claim 1, wherein said membrane is integrated with a machine screw, with said machine screw being capable of being screwed in the proximity of a through channel of said pressure compensation device.

3. The storage reservoir according to claim 2, wherein said membrane comprises a textile material onto which polytetrafluoroethylene is applied.

4. The storage reservoir according to claim 1, wherein said pressure compensation device further includes an outlet valve which is to open if the reservoir interior space is overfilled with lubricant.

5. The storage reservoir according to claim 4, wherein said outlet valve comprises the radial shaft sealing ring, with said radial shaft sealing ring having a soft sealing lip that is to lift from said sealing seat under pressure from within the reservoir interior space, and with said radial shaft sealing ring forming a seal under pressure from exterior of the reservoir interior space.

6. The storage reservoir according to claim 1, wherein said membrane comprises a textile material onto which polytetrafluoroethylene is applied.

7. The storage reservoir according to claim 1, wherein said pressure compensation device is tightly clamped in an opening of said cover wall.

8. The storage reservoir according to claim 1, wherein said pressure compensation device can be tightly clamped in an opening of said cover wall via a sealing ring between said cover wall and said pressure compensation device.

9. The storage reservoir according to claim 1, wherein said pressure compensation device further includes a through channel, with said membrane being in said through channel, and
as viewed from the reservoir interior space, in front of said membrane is disposed an overpressure valve that is to close under overpressure obtained in the reservoir interior space.

10. The storage reservoir according to claim 1, wherein said upper part is centered on said lower part via a circumferential edge.

11. A storage reservoir for receiving lubricant for a lubricant pump, comprising:
a side wall defining a reservoir interior space;
a cover wall, at an end of said side wall, for closing the reservoir interior space; and
a pressure compensation device having an air permeable but water impermeable membrane for communicating the reservoir interior space with a space exterior of the reservoir interior space,
wherein said pressure compensation device includes an outlet valve which is to open if the reservoir interior space is overfilled with lubricant, and
wherein said outlet valve comprises a radial shaft sealing ring, with said radial shaft sealing ring having a soft sealing lip that is to lift from a sealing seat under pressure from within the reservoir interior space, and with said radial shaft sealing ring forming a seal under pressure from exterior of the reservoir interior space.

12. The storage reservoir according to claim 11, wherein said membrane is integrated with a machine screw, with said machine screw being capable of being screwed in the proximity of a through channel of said pressure compensation device.

13. The storage reservoir according to claim 11, wherein said membrane comprises a textile material onto which polytetrafluoroethylene is applied.

14. The storage reservoir according to claim 11, wherein said pressure compensation device is tightly clamped in an opening of said cover wall.

15. A storage reservoir for receiving lubricant for a lubricant pump, comprising:
- a side wall defining an interior reservoir space;
- a cover wall, at an end of said side wall, for closing the reservoir interior space; and
- a pressure compensation device having an air permeable but water impermeable membrane for communicating the reservoir interior space with a space exterior of the reservoir interior space,
- wherein said pressure compensation device includes a through channel, with said membrane being in said through channel, and
- wherein, as viewed from the reservoir interior space, in front of said membrane is disposed an overpressure valve that is to close under overpressure obtained in the reservoir interior space.

16. The storage reservoir according to claim 15, wherein said membrane is integrated with a machine screw, with said machine screw being capable of being screwed in the proximity of said through channel.

17. The storage reservoir according to claim 15, wherein said membrane comprises a textile material onto which polytetrafluoroethylene is applied.

18. The storage reservoir according to claim 15, wherein said pressure compensation device further includes an outlet valve which is to open if the reservoir interior space is overfilled with lubricant.

19. The storage reservoir according to claim 15, wherein said pressure compensation device is tightly clamped in an opening of said cover wall.

* * * * *